United States Patent [19]

Stewart

[11] Patent Number: 4,939,793
[45] Date of Patent: Jul. 3, 1990

[54] INTEGRATED CIRCUIT ASSEMBLY WITH OPTICALLY COUPLED COMPONENTS

[75] Inventor: William J. Stewart, Northants, England

[73] Assignee: Plessey Overseas Limited, Ilford, United Kingdom

[21] Appl. No.: 137,532

[22] PCT Filed: Apr. 14, 1987

[86] PCT No.: PCT/GB87/00250
§ 371 Date: Jan. 28, 1988
§ 102(e) Date: Jan. 28, 1988

[87] PCT Pub. No.: WO87/06411
PCT Pub. Date: Oct. 22, 1987

[30] Foreign Application Priority Data

Apr. 17, 1986 [GB] United Kingdom ............. 8609447

[51] Int. Cl.$^5$ .................................... H04B 9/00
[52] U.S. Cl. .................................. 455/605; 455/600; 455/607; 350/3.72
[58] Field of Search ............. 455/600, 605, 606, 607, 455/609, 611, 613, 615, 616, 617, 618, 619; 350/3.72

[56] References Cited

U.S. PATENT DOCUMENTS

| | | | |
|---|---|---|---|
| 4,393,515 | 7/1983 | de Neumann | 455/606 |
| 4,682,323 | 7/1987 | Corfield | 455/612 |
| 4,752,120 | 7/1988 | Shimizu | 455/616 |
| 4,775,971 | 10/1988 | Bergmann | 455/618 |

FOREIGN PATENT DOCUMENTS

| | | | |
|---|---|---|---|
| 3150642 | 7/1983 | Fed. Rep. of Germany | 455/605 |
| 0207742 | 12/1983 | Japan | 455/605 |
| 0174033 | 10/1984 | Japan | 455/605 |
| 0194632 | 10/1985 | Japan | 455/605 |
| 2186457 | 8/1987 | United Kingdom | 455/605 |

OTHER PUBLICATIONS

"Interconnection of Computer Units", IBM Tech, Shah, Nov. 1966, vol. 9, #6, pp. 649–650.
"Subscriber Loop Architecture", AT and T Tech, Cheng et al., Sep. 1984, #75, pp. 9–10.

Primary Examiner—Joseph A. Orsino
Assistant Examiner—L. Van Beek
Attorney, Agent, or Firm—Fleit, Jacobson, Cohn, Price, Holman & Stern

[57] ABSTRACT

A system for optically coupling components of one or more integrated circuits comprising a light source, means for focussing the light onto a modulatable electro-optic material located on or in a substrate, the electro-optic material being disposed above and partially covering a reflective coating. The focussing means is arranged relative to the covered and uncovered portions of the reflective coating and relative to a detector element on or in the substrate whereby reflected modulated light from the electro-optic material and reflected unmodulated light from the uncovered portion of the reflective coating are superimposed to create an amplitude modulated beam for focussing on the detector element.

10 Claims, 2 Drawing Sheets

INTEGRATED CIRCUIT ASSEMBLY WITH OPTICALLY COUPLED COMPONENTS

BACKGROUND OF THE INVENTION

The present invention relates to integrated circuits and more particularly to a method of optically coupling components of integrated circuits.

DESCRIPTION OF THE RELATED ART

As is well known integrated circuits are complete electronic circuits containing transistors and perhaps diodes, resistors or capacitors all made from, and on, a chip of semiconductor material, typically silicon. The connections between the components of the chip are electrical and in the main confined to a two dimensional surface. When it is desired to provide sets of electrical connections between components of large-scale (LSI) or very-large scale integrated (VLSI) circuit design difficulties may arise as a result of the lack of surface area on the chip. Each integrated circuit is normally packaged within its own protective plastic case, the packaging taking many different forms but all being provided with terminal pins for receiving and transmitting data. In LSI or VLSI circuits the number of terminal pins may be large compared with the surface area of the chip and the terminal pins and their interconnections may give rise to circuit design difficulties which may affect the dependability of the circuits. The circuit design may be further complicated when a number of integrated circuits are interconnected to operate together as an integrated system as the number of connections between the integrated circuits may be very large indeed.

SUMMARY OF THE INVENTION

According to the present invention, by providing a optical coupling between a modulator elements and a detector element on the chip the above design difficulties can be largely overcome. Furthermore, an optical coupling arrangement according to the present invention provides a method for coupling components on separate chips and provides a means for the electrical switching of components leading to a programmable design architecture for the chips.

According to the present invention there is provided a method of optical coupling between components of one or more integrated circuits comprising the steps of focussing electromagnetic radiation onto a modulator element associated with the or one of the integrated circuits, modulating the radiation at the modulator element, reflecting the modulated radiation in a direction away from the modulator element and focussing the modulated radiation onto a detector element associated with the same or a different integrated circuit.

An aspect of the present invention is the provision of a system for optically coupling components of one or more integrated circuits comprising a source of electromagnetic radiation, focussing means for focussing the radiation from the source onto a modulator component associated with the or one of the integrated circuits, a reflective means for reflecting the modulated radiation towards the focussing means, and a detector element associated with the same or a different integrated circuit for receiving the modulated radiation from the focussing means.

Conveniently the electromagnetic radiation is light, that is to say having a wavelength within that part of the spectrum between the infra-red to ultra-violet. Advantageously a laser is used as the source of light and conveniently the wavelength of the light is substantially within the range 0.6 to 10.0 μm.

Preferably the integrated circuit has a silicon substrate at least some of its component elements being formed by doping with group III or group IV impurities.

In one embodiment of the present invention the detector element is a PIN diode formed in the substrate, the PIN diode being responsive to variations in the intensity of the modulated radiation incident on the PIN diode.

In a preferred embodiment of the present invention the modulator element is an electro-optic material applied to, formed in, or sputtered onto the substrate, a pair of electrodes being disposed in or attached to the substrate in the vicinity of the electro-optic material for creating an electric field in the electro-optic material when a voltage is applied across the electrodes. The electro-optic material and pair of electrodes form an electro-optic phase modulator to phase modulate a beam of light passing through the electro-optic material when the electric field is applied. In the preferred embodiment a beam of light whose phase is unmodulated is superimposed on the phase modulated beam so as to create an amplitude modulated beam which is focussed on the detector element.

BRIEF DESCRIPTION OF THE PRIOR ART

Embodiments of the present invention will now be described by way of example with reference to the accompanying drawings in which.

DESCRIPTION OF THE PREFERRED EMBODIMENT

Figure 1:
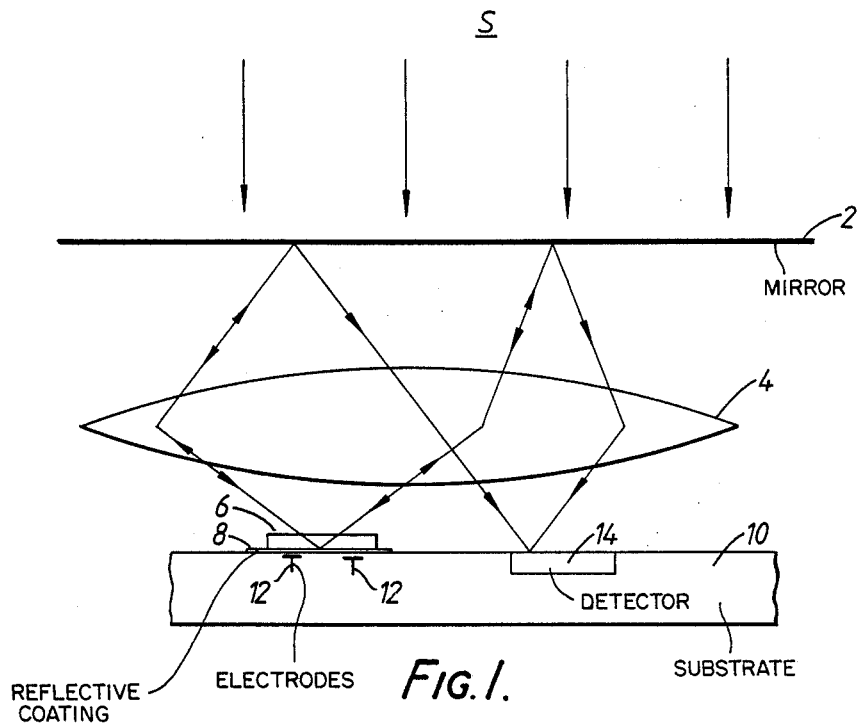
FIG. 1 shows in schematic form an optical coupling arrangement for an integrated circuit in accordance with one embodiment of the present invention.

Referring to FIG. 1 a laser beam, from a source S, is focussed by a partially reflecting mirror 2 and a lens 4 onto a transparent electro-optic material 6, such as PLZT, sputtered onto a reflective coating 8, typically formed on the surface of a silicon substrate 10.

Two spaced electrodes 12 are disposed in the substrate 10 below the material 6 so as to form therewith an electro-optic modulator. In operation a steady or varying voltage is applied between the electrodes 12, the voltage being dependent on the signal which it is desired to transmit to a detector 14, typically a PIN diode, realised in the silicon 10. The voltage across the electrodes 12 creates an electric field within the electro-optic material 6 and by means of the electro-optic effect produces a change in the refractive index of the electro-optic material 6 as a function of the electric field strength.

The light wave as it passes through the electro-optic material 6 experiences a phase change which is dependent on the change in the refractive index and on the length of the optical path of the laser beam through the electro-optic material.

The laser beam is reflected by the coating 8 back through the electro-optic material 6, the phase modulated beam after leaving the electro-optic material 6 being re-focussed by the lens 4 and the partially reflecting mirror 2 onto the detector 14.

Figure 2:
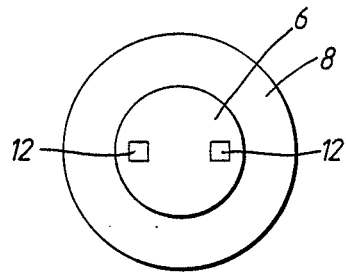
FIG. 2 is a top view of the modulator in FIG. 1.

It is necessary to provide an amplitude modulated beam the intensity of which can be detected by the detector 14. One method of providing an amplitude modulated laser beam at the detector 14 is to superimpose onto the phase modulated beam the unmodulated laser beam from the source S so as to create a system which behaves as an interferometer. One such system is shown in FIGS. 1 and 2 in which the reflective coating 8 extends beyond the edges of the electro-optic material 6.

In operation the unmodulated laser beam is focussed by the lens 4 not only on the electro-optic material 6 but also on the uncovered areas of the reflective coating 8. The portion of the laser beam reflected from the uncovered areas of the reflective coating 8 is unchanged in phase and when re-focussed by the lens 4 and the mirror 2 arrangement onto the detector 14 combines with the phase modulated beam. The system therefore behaves as an interferometer and the output of the detector 14 varies as the voltage-controlled phase-shift varies the degree of constructive interference.

An embodiment of the present invention will now be described with reference to FIG. 3, identical features to FIG. 1 being designated by identical reference numerals.

Figure 3:
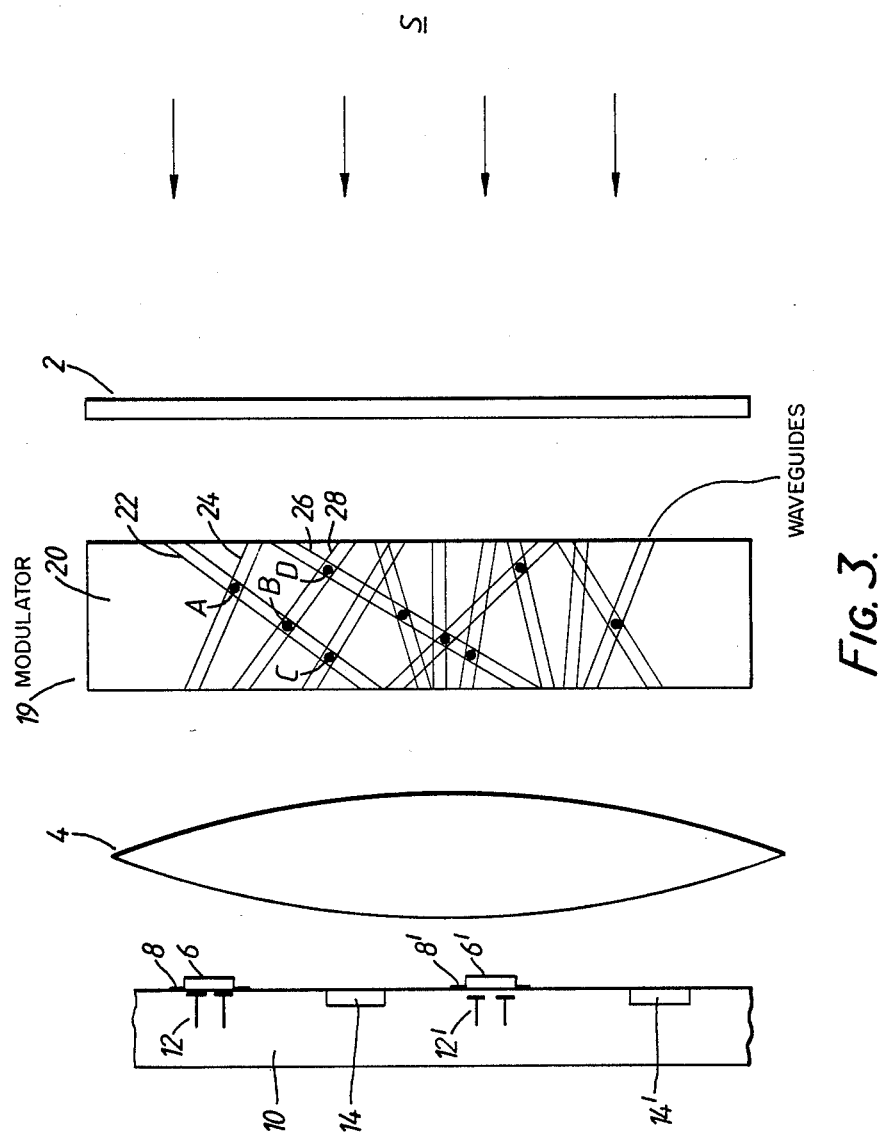
FIG. 3 shows in schematic form an optical coupling arrangement for an integrated circuit in accordance with a second embodiment of the present invention.

The arrangement illustrated in FIG. 3 differs from FIG. 1 firstly in that the substrate 10 has two modulator elements, the second being defined by an electro-optic material 8' and a pair of associated electrodes 12'. Similarly there is a second detector element in the form of a PIN diode 14'.

The second difference to the embodiment of FIG. 1 is the provision of a waveguide crossover electro-optic modulator 19. The modulator 19 comprises an opaque block of material 20 having a number of waveguides, four of which in FIG. 3 are numbered 22, 24, 26, 28, extending between the major faces of the block. The waveguides form optical paths through the block 20 and are arranged to define crossover points A, B, C, D. The waveguides, are made of an electro-optic material and each crossover point A, B, C, D is associated with a respective pair of electrodes (not shown). In operation in the absence of an applied voltage the light passing along any particular waveguide passes straight through the crossover point and out of the other end of the waveguide. On the other hand the application of a voltage to a pair of electrodes reduces the refractive index of the material at the associated crossover point, through the electro-optic effect, sufficiently for total internal reflection to occur. This results in the light incident on the end of one waveguide, for example the end of waveguide 22 located at one face of the block 20, crossing over at point A to emerge from the end of waveguide 24 at the opposite face of the block 20. In this way the modulator 19 functions as a crossover switch so that light modulated within the electro-optic material 6 and reflected can be focussed by means of the lens 4, modulator 19 and partially reflecting mirror 2 on either or both of the PIN diodes 14, 14'. Likewise light unmodulated and reflected from the electro-optic material can be focussed on one or both of the detectors 14, 14'.

It will be appreciated that the reflective element although described in the embodiments above as a partially reflecting mirror 2 can be replaced by an arrangement of mirrors or a reflective hologram, the hologram giving a general repeated pattern of connections. The use of a modulatable hologram provides an embodiment having switching functions. The retroreflective nature of the systems described above with a hologram or specific mirror arrangements also reduces alignment tolerances.

In other embodiments of the present invention optical coupling is provided between two or more chips side-by-side or (using two lenses) face-to-face.

I claim:

1. A system for optically coupling components of one or more integrated circuits comprising a source of electromagnetic radiation, focussing means for focussing the radiation from the source onto a modulator component associated one of the integrated circuits, wherein the modulator element is an electro-optic material applied to, formed in, or sputtered onto the substrate, a pair of electrodes being disposed in or attached to the substrate in the vicinity of the electro-optic material for creating an electric field in the electro-optic material when a voltage is applied across the electrodes, the electro-optic material and pair of electrodes forming an electro-optic phase modulator for phase modulating a beam of light passing through the electro-optic material when the electric field is applied, a reflective means located next to said modulator component for reflecting the resulting modulated radiation towards the focussing means, and a detector element associated with one of said integrated circuits for receiving the modulated radiation from the focussing means.

2. A system for optically coupling components of one or more integrated circuits as claimed in claim 1 wherein the source of electromagnetic radiation is a laser for transmitting a wavelength of light substantially within the range 0.6 to 10 $\mu$m.

3. A system for optically coupling components of one or more integrated circuits as claimed in claim 1 wherein the integrated circuit has a silicon substrate at least some of its component elements being formed by doping with group III or group IV impurities.

4. A system for optically coupling components of one or more integrated circuits as claimed in claim 1 wherein the detector element is a PIN diode formed in the substrate, the PIN diode being responsive to variations in the intensity of the modulated radiation incident on the PIN diode.

5. A system for optically coupling components of one or more integrated circuits as claimed in claim 1 wherein the reflective means and the focussing means are arranged relative to one another, and relative to the detector element and the modulator component to superimpose a beam of reflected unmodulated radiation on the reflected modulated radiation to provide an amplitude modulated beam of radiation focused on the detector element.

6. A system for optically coupling components of one or more integrated circuits as claimed in claim 5 wherein the reflective means is partially covered by the modulator component, the focussing means being located relative to the uncovered area of the reflective coating to focus a part of the electromagnetic radiation from the source onto the uncovered area whereby unmodulated radiation reflected from the uncovered are is superimposed on the reflected modulated radiation by the focussing means to provide the amplitude modulated beam.

7. A system for optically coupling components of one or more integrated circuits as claimed in claim 1 wherein the focussing means comprises a lens and a partially reflecting mirror.

8. A system for optically coupling components of one or more integrated circuits as claimed in claim 1 wherein the focussing means comprises a lens and an arrangement of mirrors.

9. A system for optically coupling components of one or more integrated circuits as claimed in claim 1 wherein the focussing means comprises a lens and a hologram component.

10. A system for optically coupling components of one or more integrated circuits as claimed in claim 9 wherein the hologram component is in the form of a modulatable hologram thereby providing a switching function within the system.

* * * * *